(12) United States Patent
Yoshioka (10) Patent No.: US 8,081,334 B2
(45) Date of Patent: Dec. 20, 2011

(54) IMAGE FORMING APPARATUS

(75) Inventor: Tetsuya Yoshioka, Osaka (JP)

(73) Assignee: Kyocera Mita Corporation (JP)

( * ) Notice: Subject to any disclaimer, the term of this patent is extended or adjusted under 35 U.S.C. 154(b) by 1195 days.

(21) Appl. No.: 11/827,355

(22) Filed: Jul. 11, 2007

(65) Prior Publication Data
US 2008/0013123 A1 Jan. 17, 2008

(30) Foreign Application Priority Data

Jul. 13, 2006 (JP) .................................. 2006-192573

(51) Int. Cl.
*G06F 3/12* (2006.01)
*G06K 15/00* (2006.01)

(52) U.S. Cl. ............. 358/1.15; 358/1.13; 358/1.14; 358/1.16; 358/1.17; 358/1.18

(58) Field of Classification Search ........ 358/1.11–1.18, 358/444; 707/203
See application file for complete search history.

(56) References Cited

U.S. PATENT DOCUMENTS

| | | | |
|---|---|---|---|
| 6,906,813 B1 * | 6/2005 | Tuchitoi et al. | 358/1.14 |
| 7,190,469 B1 * | 3/2007 | Gomi | 358/1.14 |
| 7,724,741 B2 * | 5/2010 | Sato | 370/392 |
| 2001/0013954 A1 * | 8/2001 | Nagai et al. | 358/444 |
| 2004/0215671 A1 * | 10/2004 | Hyakutake et al. | 707/203 |
| 2005/0141030 A1 * | 6/2005 | Tuchitoi et al. | 358/1.16 |

FOREIGN PATENT DOCUMENTS

| | | |
|---|---|---|
| JP | 6-13259 | 1/1994 |
| JP | 10-123881 | 5/1998 |
| JP | 11-3004 | 1/1999 |
| JP | 2000-76083 | 3/2000 |

* cited by examiner

*Primary Examiner* — Mark K Zimmerman
*Assistant Examiner* — Satwant Singh
(74) *Attorney, Agent, or Firm* — Gerald E. Hespos; Michael J. Porco (57) ABSTRACT

An image forming apparatus is operative to avoid user confusion during a job-cancelling operation. A job executing portion of the apparatus executes at least one of a copy job, a print job, a facsimile reception job, an e-mail reception job, a facsimile transmission job, and an e-mail transmission job. A suspending portion of the apparatus suspends a printing-out operation of a running job in response to pressing a stop/clear key. A job list screen display controller allows a display portion to display a suspending job list screen for showing a user a suspended job and a waiting job. A cancel job selection receiving portion receives a user selection of a job to be cancelled among the jobs displayed on the suspending job list screen. A job cancelling portion then cancels the job received by the cancel job selection receiving portion.

11 Claims, 7 Drawing Sheets

IMAGE FORMING APPARATUS

BACKGROUND OF THE INVENTION

1. Field of the Invention

The present invention relates to an image forming apparatus which is capable of executing at least one of a copy job, a print job, a facsimile transmission/reception job and an e-mail transmission/reception job and managing these jobs. More particularly, it relates to an image forming apparatus having a job-cancelling function.

2. Description of the Related Art

A compact image forming apparatus is multi-functional and has a display panel which is small in size and not provided with a touch panel. Therefore, there are provided many hardware keys. If a stop key is provided for a respective kind of job, a user is confused in selection of a key, and an operation to stop a job is delayed. Accordingly, it is not preferable. Therefore, only one stop key which is not dependent on a kind of job is provided for stopping a job.

In Japanese Utility Model Publication No. HE16-13259, a facsimile apparatus is disclosed in which a message "Select an operation which should be stopped." is displayed on an LCD along with selectable character strings of "copy", "send" and "other function" in response to a press-on of a stop key. A user moves a cursor to a selectable character string corresponding to a function which should be stopped and then presses on the stop key again. In response to the press-on of the stop key, the facsimile apparatus stops only the selected operation.

However, in the above-described facsimile apparatus, only one of the functions of "copy", "send", and "other function" is selected. Accordingly, only a job which is currently in execution can be stopped, and a waiting job cannot be cancelled. Therefore, a cancel key for cancelling a waiting job and a menu exclusive for a cancelling should be provided, and it causes a problem that a configuration becomes complicated. Further, when a user would like to stop a job in execution, there is a tendency that he does not press a stop key but presses a cancel key by mistake, and an operation of stopping a job is unintentionally delayed.

Further, the cancel key is easily confused with a clear key for clearing the number of printings and the inputted contents. Accordingly, when these keys are provided on the operation panel, a user is confused in selection of a key. By adapting one multi-purpose key which is operable to serve as a stop key, a cancel key and a clear key, the number of keys can be reduced, and a user is not confused in selection of a key.

However, when the multi-purpose key is pressed, it is not clear whether the key is pressed for stopping a job in execution, cancelling a waiting job, or clearing the number of printings. Accordingly, the number of selectable menu representation shown to a user after a press-on of the multi-purpose key is increased, thereby causing a problem that an operability of the facsimile apparatus becomes worse.

Further, in the above-described facsimile apparatus, if one job in execution is stopped, other job is shifted to an execution mode. Accordingly, a user must repeat a routine of suspending and resuming a job to stop a plurality of jobs. Therefore, irrelevant repetitions of stopping and executing of operations must be made, and a user has to perform the operations in hurry to shorten an irrelevant operating time of operation, thereby causing a problem that operability becomes worse.

SUMMARY OF THE INVENTION

The present invention was worked out to solve the above-described problem, and its object is to provide an image forming apparatus capable of allowing a user to perform a job cancelling operation without confusion in selection of a key and improving operability.

An image forming apparatus according to one aspect of the present invention comprises: a job executing portion for executing at least one of a copy job, a print job, a facsimile reception job, an e-mail reception job, a facsimile transmission job, and an e-mail transmission job; a display portion; operation portion including a stop key for receiving an instruction to suspend a running job which is in execution; a suspending portion for suspending a printing-out operation of the running job in response to a press-on of the stop key; a job list screen display controller for allowing the display portion to display a job list screen showing the job suspended by the suspending portion and a waiting job; a cancel job selection receiving portion for receiving a user selection of a job to be cancelled among the jobs displayed on the job list screen; and a job cancelling portion for cancelling the job received by the cancel job selection receiving portion.

These and other objects, features and advantages of the present invention will become more apparent upon reading of the following detailed description along with the accompanied drawings.

BRIEF DESCRIPTION OF THE DRAWINGS

FIG. 3 shows an example of screens displayed when keys on the operation panel are pressed-on.

DETAILED DESCRIPTION OF THE PREFERRED EMBODIMENTS

Hereinafter, an embodiment of the present invention will be described with reference to the attached drawings. The embodiment which will be described hereinafter is an example embodying the present invention, and it has no characteristic of restricting a technical scope of the present invention.

Figure 1:
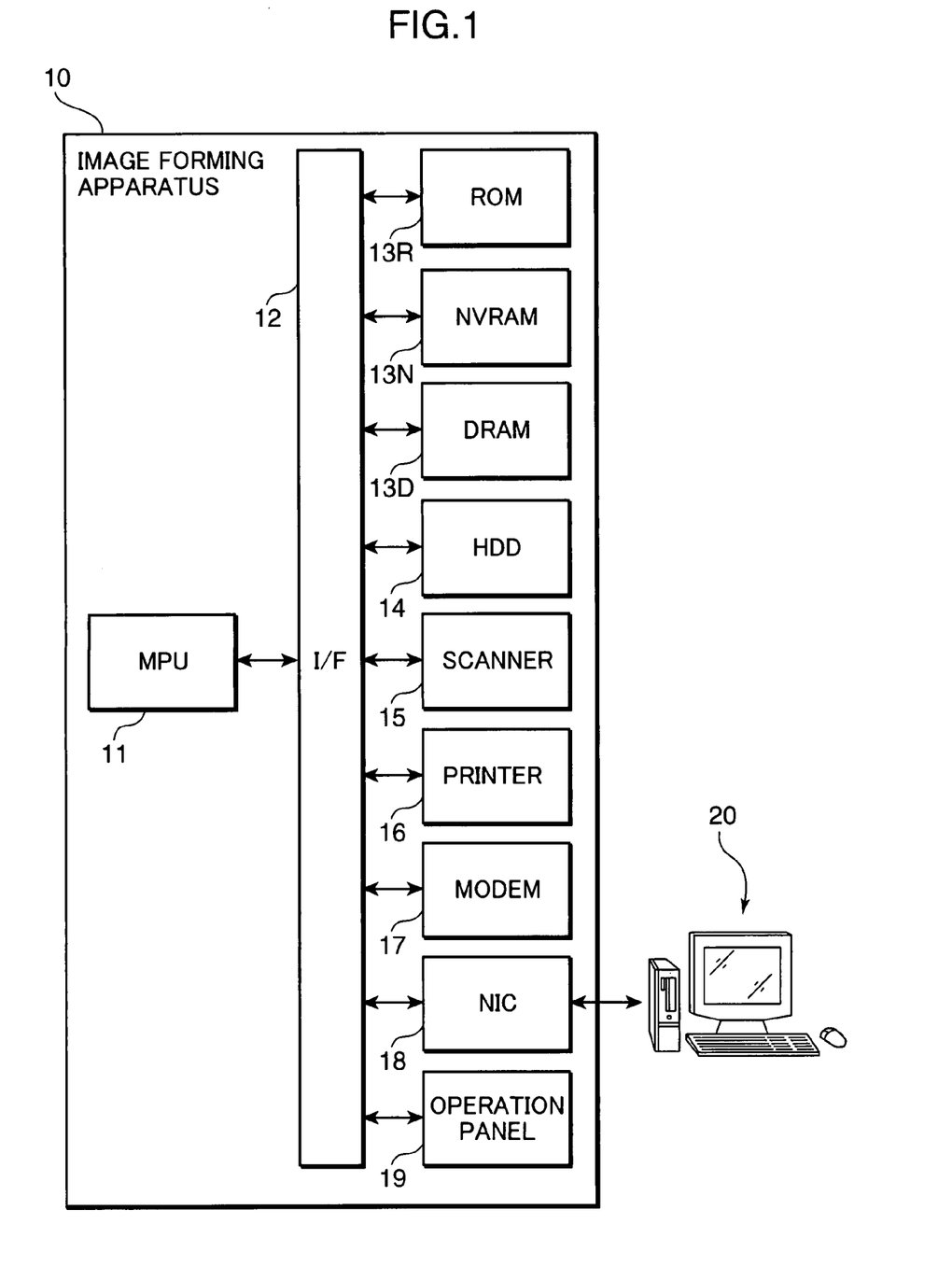
FIG. 1 is a block diagram schematically showing a hardware configuration of an image forming apparatus according to an embodiment of the present invention.

FIG. 1 is a block diagram schematically showing a hardware configuration of an image forming apparatus 10 according to an embodiment of the present invention.

The image forming apparatus 10 shown in FIG. 1 includes an MPU (Micro-Processing Unit) 11, an I/F (interface) 12, a ROM (Read Only Memory) 13R, a NVRAM (Non Volatile RAM) 13N, a DRAM (Dynamic RAM) 13D, an HDD (Hard Disk Drive) 14, a scanner 15, a printer 16, a modem 17, an NIC (Network Interface Card) 18 and an operation panel 19.

The MPU 11 controls the whole image forming apparatus 10 and is connected to the ROM 13R, the NVRAM 13N, the DRAM 13D, the HDD 14, the scanner 15, the printer 16, the modem 17, the NIC 18 and the operation panel 19 via the I/F 12. In FIG. 1, a plurality of interfaces are depicted as one block for simplification.

The ROM 13R stores a bootstrap and a BIOS. The NVRAM 13N is, for example, a flash memory and stores an operating system (OS), an application which runs in an upper layer of the OS, various device drivers which runs in a lower layer of the OS and various set values. This application allows the image forming apparatus 10 to serve as a complex machine having a copying function, a scanning function, a printing function and a facsimile function. The DRAM 13D serves as a working area of the MPU 11. The HDD 14 stores various data.

The scanner 15 reads out a document and acquires image data in operations of a copying and a facsimile transmission. The printer 16 includes a print engine, a fixing device, a sheet feeder, a conveying portion and a sheet-discharging portion. In the printer 16, an electrostatic latent image is formed on a photoconductive drum of the print engine based on bitmap data given as print data. The electrostatic latent image is developed with toner particles, transferred to a sheet and then discharged.

The modem 17 transmits and receives facsimile data to and from outside. The NIC 18 is connected to a host computer 20 in a network and used for a print job. Specifically, the NIC 18 receives print data transmitted from the host computer 20. The operation panel 19 receives a set value or an instruction inputted by a user and allows a setting screen and a status to be displayed.

Figure 2:
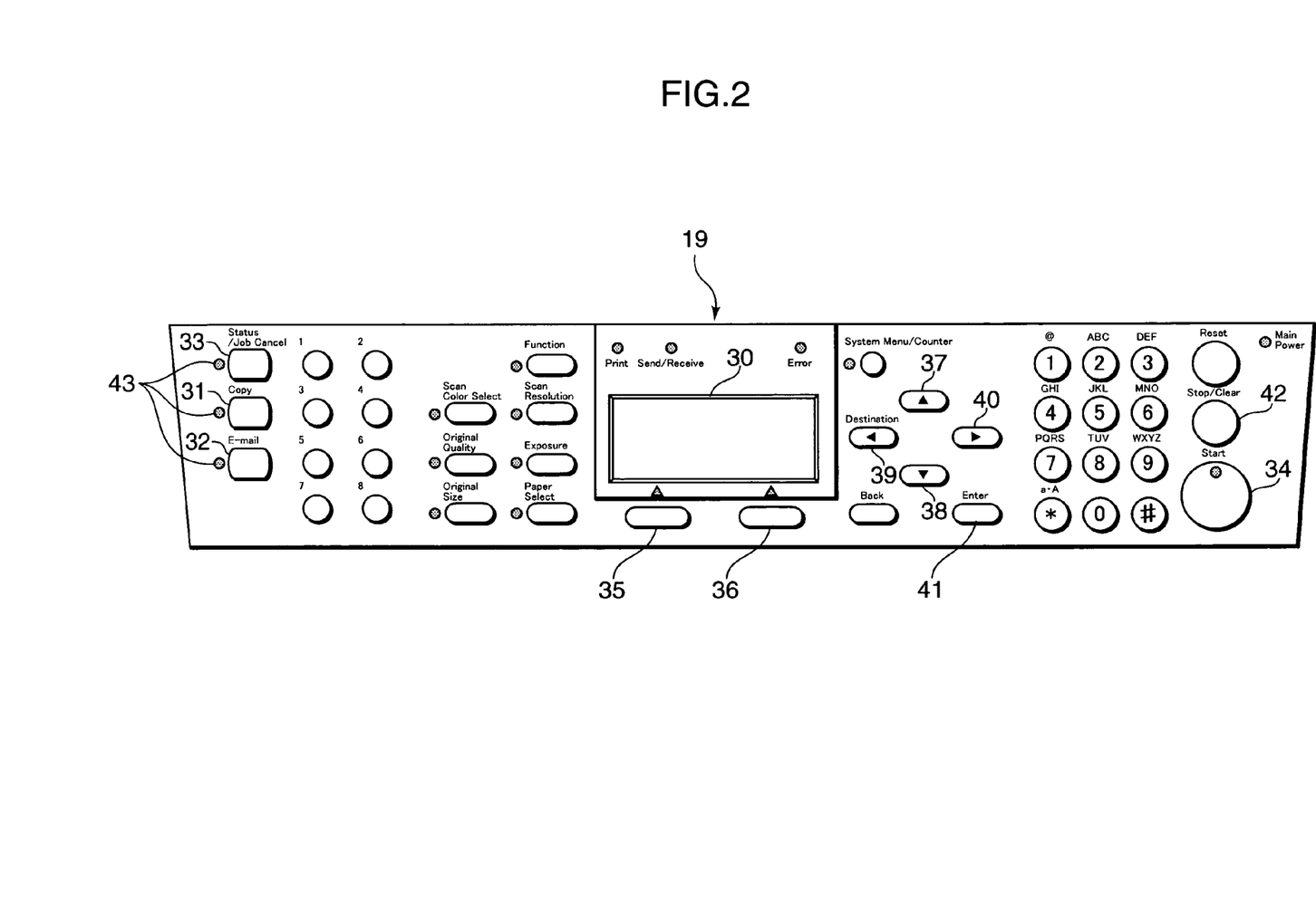
FIG. 2 is a plan view showing an operation panel.
Figure 3:
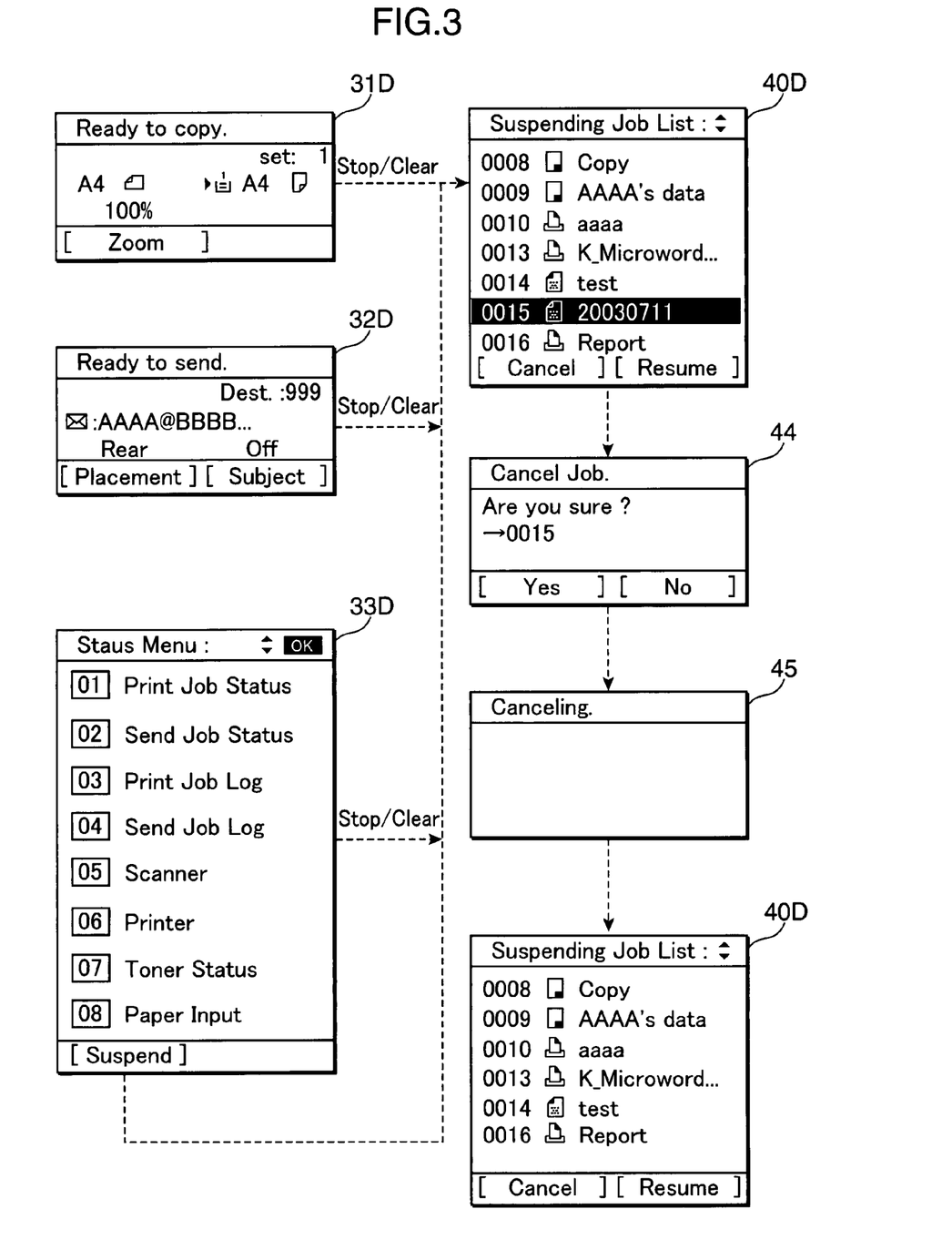

FIG. 2 is a plan view showing an operation panel 19. FIG. 3 shows an example of a screen which is displayed when a key on the operation panel 19 is pressed on by a user. The operation panel 19 is provided with a compact display panel 30. A text display size of the display panel 30 is relatively small e.g. twenty-one letters per line by five lines. Since the display panel 30 does not include a touch panel, and the image forming apparatus 10 has many functions, the operation panel 19 is provided with a large number of operation keys. Further, in FIG. 2, LEDs (Light Emitting Diode) 43 are provided for indicating whether keys adjacent to the respective LEDs are in an ON-state or an OFF-state. When a key is in an ON-state, a respective LED 43 is turned on. When a key is in an OFF-status, a respective LED 43 is turned off.

When a copy key 31, a send key 32 or a status/job cancel key 33 is pressed, a ready-to-copy screen 31D, a ready-to-send screen 32D or a status menu screen 33D is displayed respectively as shown in FIG. 3.

In the ready-to-copy screen 31D, the first line shows that a copying is in a ready state. When a start key 34 of FIG. 2 is pressed, a copy job is created based on specified values displayed in second to fourth lines of the ready-to-copy screen 31D. The second line shows that the number of copies is one. The third line shows that a horizontally placed A4-sized document will be scanned and copied onto a vertically placed A4-sized sheet stored in a first sheet feeder.

In the operation panel 19, the fifth line displays functions of a first function key 35 and a second function key 36 shown in FIG. 2. In response to a press-on of the first function key 35 or the second function key 36, a screen of the display panel 30 is shifted to a screen corresponding to a respective function of the function keys. For example, when the ready-to-copy screen 31D is displayed and the first function key 35 is pressed on, the screen is shifted to a magnification rate setting screen. The fourth line displays a value which is set after the press-on, or a specified value. The ready-to-copy screen 31D of FIG. 3 shows that the magnification rate is 100%.

The ready-to-send screen 32D is similar to the ready-to-copy screen 31D. The first line shows that a data transmission is in a ready state. Types of transmission include an e-mail transmission job of transmitting data by e-mail and a facsimile transmission job of transmitting data by facsimile. An icon in the beginning of the third line shows a type of transmission. The second line shows the number of multi-address transmission. The third line shows facsimile numbers or an e-mail address of a destination. When the first function key 35 is pressed on, the screen is shifted to a document setting screen for allowing a user to set how a document is placed on a document holder. When the second function key 36 is pressed on, the screen is shifted to a subject setting screen for allowing a user to set a subject of a content of transmission. The "Off" displayed in the ready-to-send screen 32D indicates that a subject is automatically added in accordance with a predetermined rule since a subject is not set by a user. In the present embodiment, the e-mail transmission job and the facsimile transmission job are collectively named as a send job.

The status menu screen 33D has a scroll portion of menu representations between a screen name in the first line and a function key name (Suspend) in the last line. On the display panel 30, there are displayed three lines of the menu representations in the scroll portion. The scroll portion is scrolled by pressing on an up key 37 and a down key 38 of FIG. 2. When a left key 39 or a right key 40 is pressed, a highlighted selection of a representation shifts upward and downward. When an enter key 41 is pressed, the screen is shifted to a status display screen concerning a selected menu representation.

The first and second lines of the scrollable menu representations respectively indicate respective statuses of a print job and a status of a send job. In the status display screen displayed after these menu representations are selected, a character string "in execution" is displayed if a job is in execution. If a job is in waiting, a character string of "waiting" is displayed. The third and fourth lines of the menu representations which are subjected to be scrolled respectively indicate a log of a terminated print job and a log of a terminated send job. The fifth and sixth lines of the scrollable menu representations respectively indicate a status of a scanner and a status of a printer. In the status display screen displayed after these menu items are selected, a character string "ready" is displayed if the scanner or the printer is in a ready state. If the scanner or the printer is in execution, a character string "in execution" is displayed. If an error occurs in the scanner or the printer, a character string "error" is displayed. Further, the seventh line of the scrollable menu representations indicates a status of toner particles. The eighth line of the scrollable menu representations indicates a status of the sheet feeder.

Here, image forming apparatus 10 is capable of executing jobs in parallel as long as the hardware resources do not compete with each other. Further, there are jobs which are in execution and waiting, and there are a plurality of types of jobs. Therefore, it is required to allow a user to cancel a job or easily clear the number of copy without any confusion.

In FIG. 2, the stop/clear key 42 is a multi-purpose key which is operable to serve as a suspending key concerning a cancelling of a job and a set value clear key for clearing a set value. Such multi-purpose key allows a user to suspend a job, cancel a running job which is in execution or a waiting job, or clear the number of copy without being confused in selecting which key should be pressed.

Figure 4:
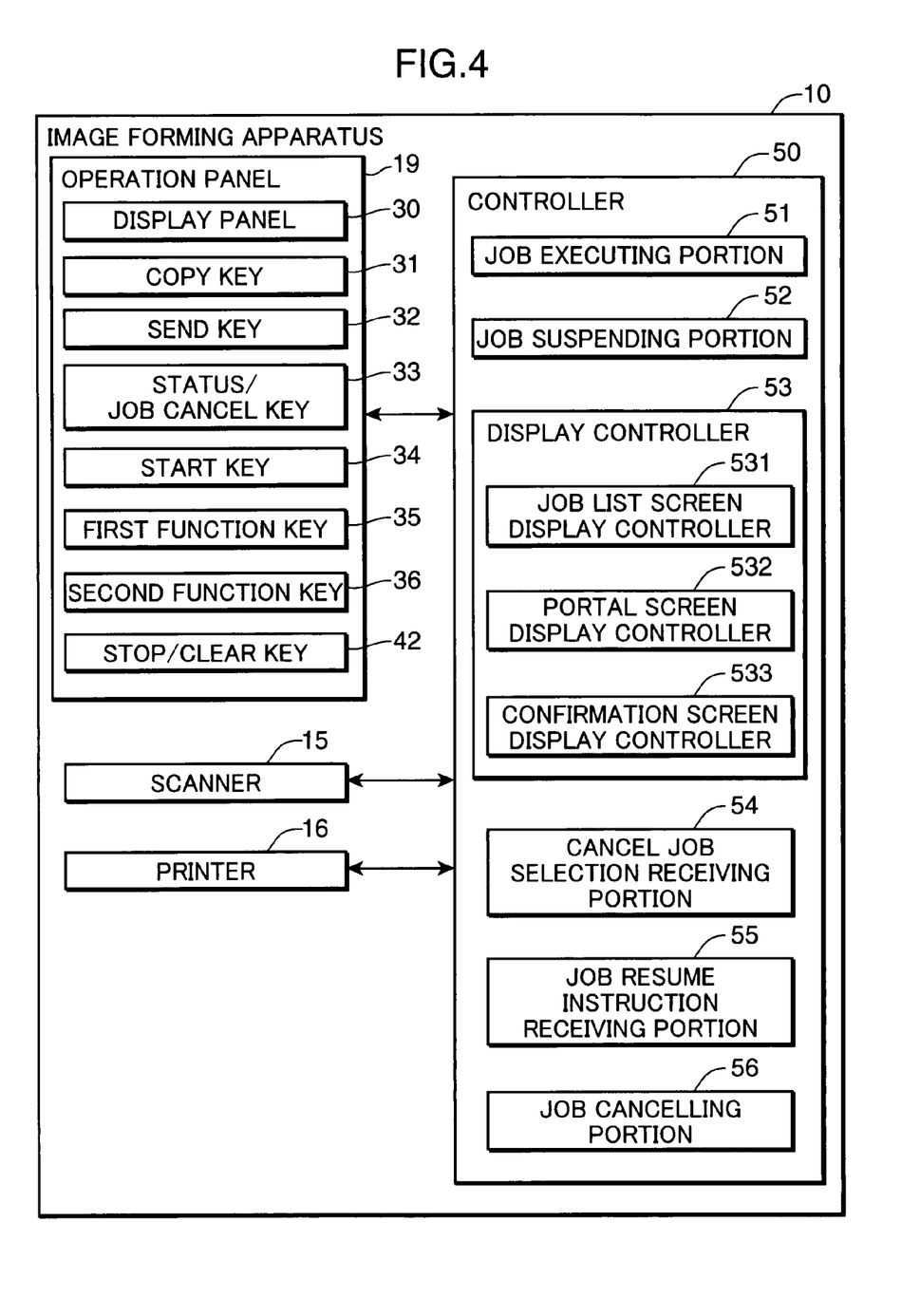
FIG. 4 is a block diagram showing a configuration of the image forming apparatus according to the embodiment.

FIG. 4 is a functional block diagram showing a configuration of an image forming apparatus according to the present embodiment. The image forming apparatus 10 shown in FIG. 4 includes a controller 50, a scanner 15, a printer 16 and an operation panel 19. In FIG. 4, only main components of the image forming apparatus according to the present embodiment are depicted. Further, configurations which are the same as those of the image forming apparatus shown in FIG. 1 are given with the same reference signs, and descriptions of those will be omitted.

The controller 50 is mainly composed of an MPU 11 and the like and includes a job executing portion 51, a job suspending portion 52, a display controller 53, a cancel job selection receiving portion 54, a job resume instruction receiving portion 55 and a job cancelling portion 56. The operation panel 19 includes a display panel 30, a copy key 31, a send key 32, a status/job cancel key 33, a start key 34, a first function key 35, a second function key 36 and a stop/clear key 42.

The job executing portion 51 executes at least one of a copy job, a print job, a facsimile reception job, an e-mail reception job, a facsimile transmission job and an e-mail transmission job. When the ready-to-copy screen is displayed on the display panel 30, and the start key 34 is pressed, the job executing portion 51 activates a scanning operation of a copy job. Further, when the ready-to-send screen is displayed on the display panel 30, and the start key 34 is pressed, the job executing portion 51 activates a scanning operation of a send job.

The job suspending portion 52 suspends a running printing-out operation of a job in response to a press-on of the stop/clear key 42. Specifically, the job suspending portion 52 suspends the printing-out operation in response to the press-on of the stop/clear key 42 after the running printing-out operation of the page in execution is completed. Further, the job suspending portion 52 suspends the printing-out operation of a copy job, a print job, a facsimile reception job and an e-mail reception job in execution when one of the copy job, the facsimile transmission job and the e-mail transmission job is in execution, and the stop key is pressed.

The display controller 53 controls the display panel 30 to display various screens. The display controller 53 includes a job list screen display controller 531, a portal screen display controller 532 and a confirmation screen display controller 533.

The job list screen display controller 531 allows the display panel 30 to display a suspending job list screen for showing the job suspended by the job suspending portion 52 and a waiting job to a user.

The portal screen display controller 532 allows the display panel 30 to selectively display in accordance with an operation of an operation panel 19 a ready-to-copy screen of receiving a copy start instruction, a ready-to-send screen of receiving a transmission start instruction of at least one of a facsimile and an e-mail, and a status menu screen for displaying a job status, a job log and a status of a hardware resource. Specifically, when the copy key 31 is pressed on, the ready-to-copy screen is displayed. When the send key 32 is pressed, the ready-to-send screen is displayed. When the status/job cancel key 33 is pressed on, the status menu screen is displayed.

The job suspending portion 52 determines in response to a press-on of the stop/clear key 42 whether or not the ready-to-copy screen, the ready-to-send screen or the status menu screen is displayed on the display panel 30. When the job suspending portion 52 determines that the ready-to-copy screen, the ready-to-send screen or the status menu screen is displayed on the display panel 30, it suspends the printing-out operation of a running job in execution.

Further, the status menu screen has a representation at a position adjacent to the first function key 35 to indicate that the first function key 35 is a key for giving an instruction of suspension. The job suspending portion 52 determines in response to a press-on of the first function key 35 whether or not the status menu screen is displayed on the display panel 30. When the job suspending portion 52 determines that the status menu screen is displayed on the display panel 30, it suspends the printing-out operation of a running job.

Furthermore, the job suspending portion 52 clears the currently set number of copy when the ready-to-copy screen is displayed on the display panel 30, and the stop/clear key 42 is pressed on. Thereafter, the job suspending portion 52 determines whether or not the ready-to-copy screen, the ready-to-send screen or the status menu screen is displayed on the display panel 30.

The cancel job selection receiving portion 54 receives a user selection of a job to be cancelled among jobs displayed on the suspending job list screen. The confirmation screen display controller 533 allows the display panel 30 to display a job cancelling confirmation screen for user confirmation about whether or not the job received by the cancel job selection receiving portion 54 should be cancelled. The job resume instruction receiving portion 55 receives a job resume instruction of resuming the job suspended by the job suspending portion 52. The job executing portion 51 resumes the suspended job when a job resume instruction is received in the job resume instruction receiving portion 55.

The job cancelling portion 56 cancels the job received by the cancel job selection receiving portion 54. Further, the job cancelling portion 56 cancels the job when it is confirmed in the job cancelling confirmation screen that the job received in the cancel job selection receiving portion 54 should be cancelled. In this case, the job list screen display controller 531 allows the display panel 30 to display a suspending job list screen not showing the job cancelled by the job cancelling portion 56.

Further, the job cancelling portion 56 cancels the copy job, and allows a sheet in execution to be discharged and allows the display portion to display the ready-to-copy screen when the scanning operation is in execution, and the stop key/clear key 42 is pressed on. Furthermore, the job cancelling portion 56 cancels the send job, allows a sheet in execution to be discharged, and allows the display panel 30 to display the ready-to-send screen when the scanning processing of the send job is in execution and the stop/clear key 42 is pressed on.

Figure 5:
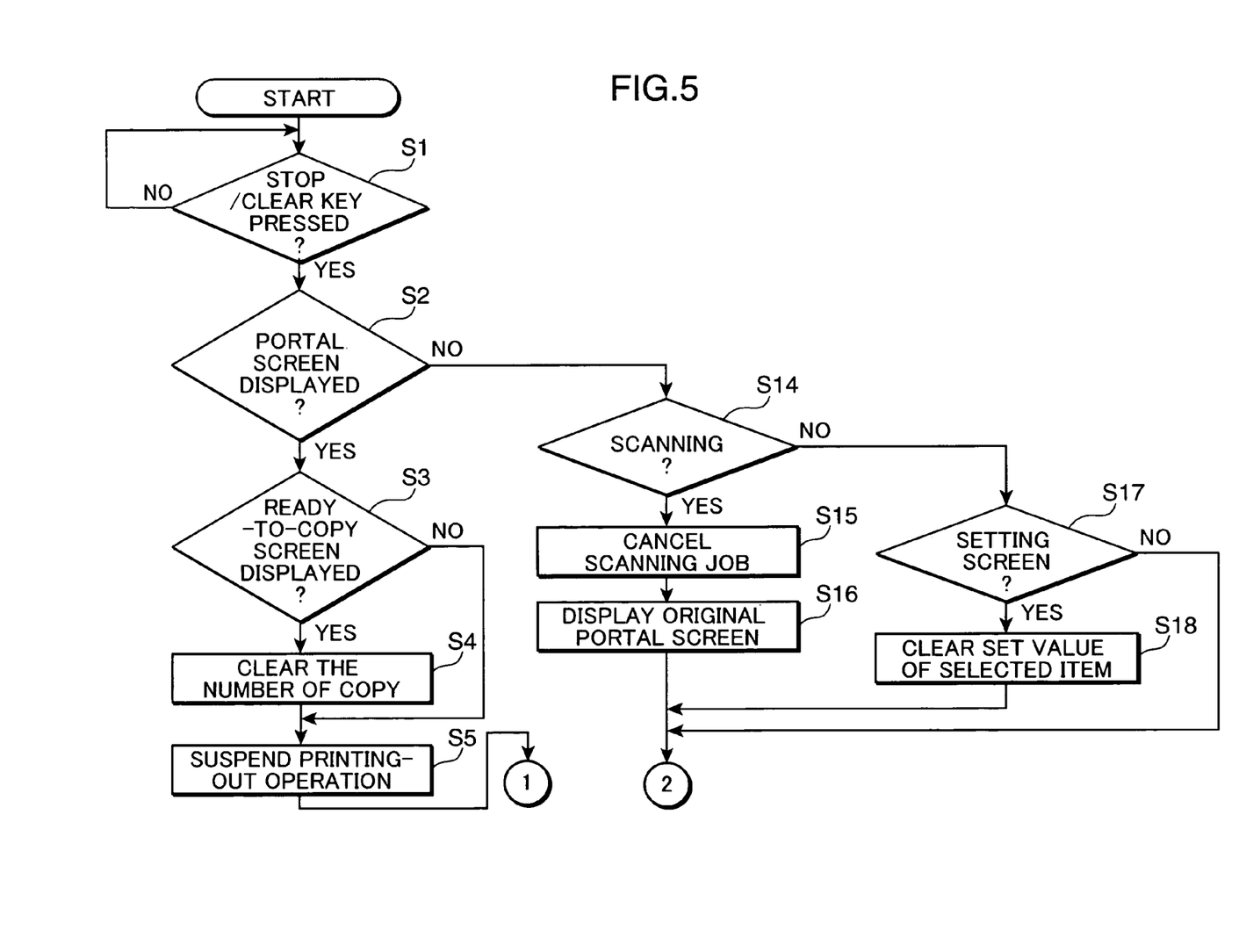
FIG. 5 is a first flowchart showing a processing which is started in response to a press-on of a stop/clear key when a ready-to-copy screen, a ready-to-send screen or a status menu screen is displayed, or in response to a press-on of a first function key when the status menu screen is displayed.
Figure 6:
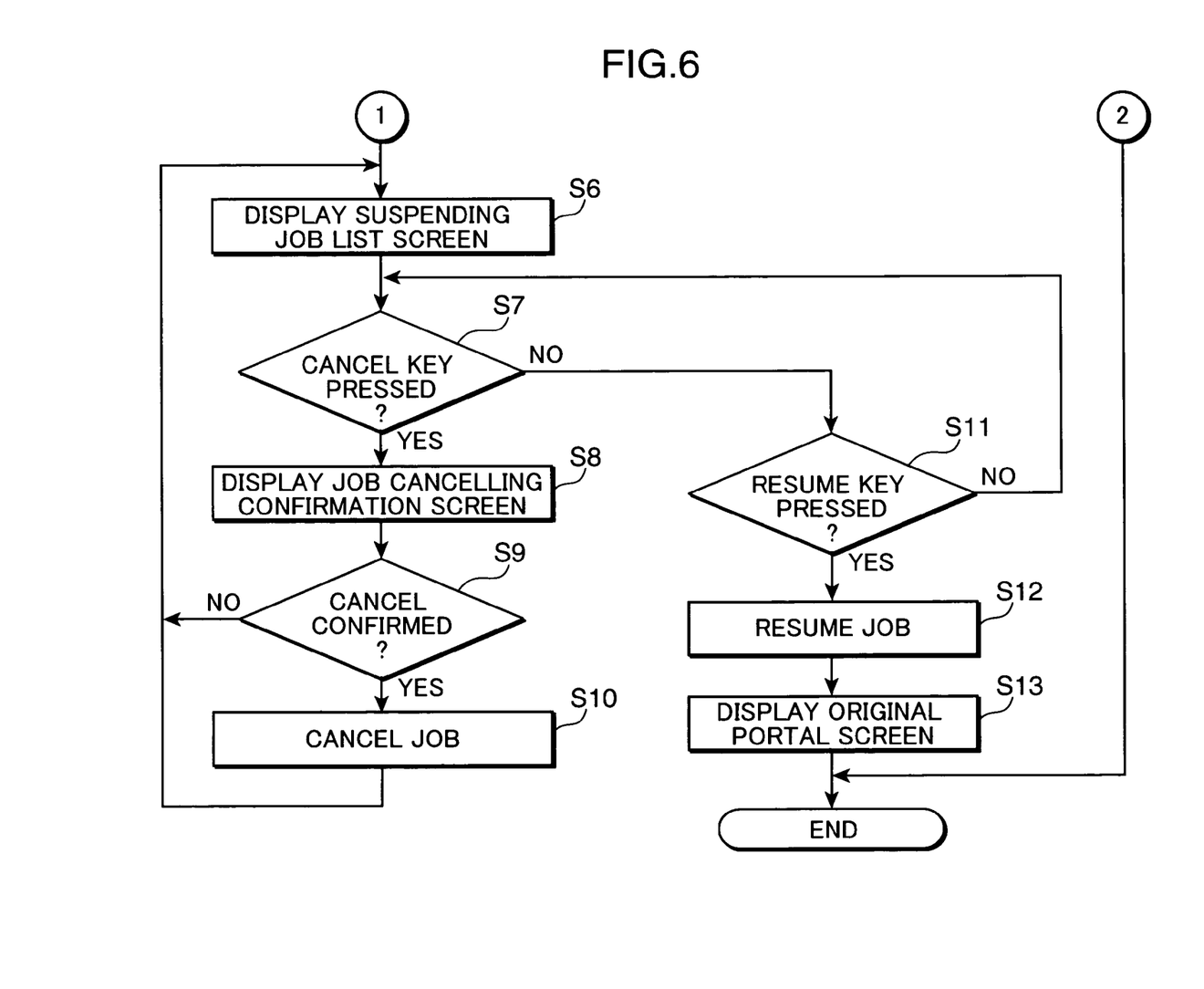
FIG. 6 is a second flowchart showing a processing which is started in response to a press-on of a stop/clear key when the ready-to-copy screen, the ready-to-send screen or the status menu screen is displayed, or in response to a press-on of a first function key when the status menu screen is displayed.

FIGS. 5 and 6 are flowcharts showing a processing which is started in response to a press-on of the stop/clear key 42 when the ready-to-copy screen 31D, the ready-to-send screen 32D or status menu screen 33D is displayed, or in response to a press-on of the first function key 35 when the status menu screen 33D is displayed.

Here, the screen displayed on the display panel 30 can be classified into the portal screen including the ready-to-copy screen 31D, the ready-to-send screen 32D and the status menu screen 33D of FIG. 3, and other setting screens.

At first, in step S1, the job suspending portion 52 determines whether or not a user pressed on the stop/clear key 42. Here, when it is determined that the stop/clear key 42 is not pressed on (NO in step S1), the determining operation of step S1 is executed repeatedly.

On the other hand, when it is determined that the stop/clear key 42 is pressed on (YES in step S1), the job suspending portion 52 determines in step S2 whether or not the screen displayed on the display panel 30 is the portal screen i.e. the ready-to-copy screen 31D, the ready-to-send screen 32D or the status menu screen 33D. Here, when it is determined that the screen displayed on the display panel 30 is not the portal screen (NO in step S2), the routine proceeds to the operation in step S14.

On the other hand, when it is determined that the screen displayed on the display panel 30 is the portal screen (YES in step S2), the job suspending portion 52 determines in step S3 whether or not the screen displayed on the display panel 30 is the ready-to-copy screen 31D. Here, when it is determined that the screen displayed on the display panel 30 is not the ready-to-copy screen 31D (NO in step S3), the routine proceeds to the processing in step S5.

On the other hand, when it is determined that the screen displayed on the display panel 30 is the ready-to-copy screen 31D (YES in step S3), the job suspending portion 52 clears in step S4 the copy number in the ready-to-copy screen 31D and makes the copy number be "1".

Next, in step S5, the job suspending portion 52 suspends the printing-out operation of a running job in execution. The suspension is executed after the printing-out operation of a page in execution is completed.

Here, the job generally includes an input operation, a data processing operation and an output operation, and operations other than the output processing are continued. For example, when the facsimile reception operation, the received data processing operation and the received data printing-out operation are executed in parallel, only the received data printing-out operation is suspended. Also in the copy job, only the printing-out operation is suspended.

Next, in step S6, the job list screen display controller 531 allows the display panel 30 to display the suspending job list screen 40D shown in FIG. 3. The suspending job list includes all of the suspending jobs, running jobs (facsimile reception or e-mail reception) and waiting jobs. The types of jobs such as the copy job, the print job, the send job and the like are displayed with identifiable icons. In a case of the copy job, whether copying of a document or printing of a content of a file in the HDD 14 is executed is displayed in an identifiable manner. In a case of the print job, the name of a file to be printed is displayed. In a case of the send job, facsimile numbers or an e-mail address is displayed.

The suspending job list screen 40D is also a scrollable screen which is similar to that of the status menu screen 33D, and a scrolling of the suspending job list and selecting of a representation (job) are made in a similar manner. In this case, the first function key 35 is used as a cancel key for cancelling a user selection of job among a plurality of jobs displayed on the suspending job list screen 40D. The second function key 36 is used as a resume key for resuming a suspended job.

Next, in step S7, the cancel job selection receiving portion 54 receives the selection of a job which is desired to be cancelled and determines whether or not the first function key 35 corresponding to the cancel key is pressed on. Specifically, as shown in FIG. 3, a user presses on the up key 37 or the down key 38 to highlight the job displayed on the suspending job list screen 40D and selects a job which he desires to cancel.

When it is determined that the first function key 35 (cancel key) is pressed (YES in step S7), the confirmation screen display controller 533 allows the display panel 30 to display the job cancelling confirmation screen 44 (refer to FIG. 3) for user confirmation about cancelling of the representation (job) selected in the suspending job list screen 40D in step S8. When the job cancelling confirmation screen 44 is displayed, the first function key 35 and the second function key 36 is operable to allow a user to input a response of "YES" or "NO" with respect to the cancelling.

Next, in step S9, the cancel job selection receiving portion 54 determines whether or not the cancelling of the job is confirmed. When the cancelling is confirmed, the first function key 35 is pressed on by a user. When the cancelling is should not be executed, the second function key 36 is pressed on by a user. Here, when a user presses on the second function key 36, and it is determined that the cancelling should not be executed (NO in step S9), the routine goes back to the operation in step S6.

On the other hand, when the first function key 35 is pressed on, and it is determined that the cancelling should is confirmed (YES in step S9), the job cancelling portion 56 cancels the selected job in step S10 and allows the display panel 30 to display a cancel-in-execution display screen 45 shown in FIG. 3 for a predetermined time. Then, the routine goes back to the operation in step S6. Accordingly, suspended jobs other than the cancelled job are continued to be suspended, and the suspended jobs can be cancelled immediately. Accordingly, cancelling of a plurality of jobs can be executed easily.

When it is determined in step S7 that the first function key 35 (cancel key) is not pressed (NO in step S7), the job resume instruction receiving portion 55 determines in step S11 whether or not the second function key 36 corresponding to the resume key is pressed on. In other words, when the second function key 36 is pressed, the job resume instruction receiving portion 55 receives a job resume instruction of resuming the suspended job. Here, when it is determined that the second function key 36 (resume key) is not pressed on (NO in step S11), the routine proceeds to the operation of step S7.

On the other hand, when it is determined that the second function key 36 (resume key) is pressed on (YES in step S11), the job executing portion 51 resumes the suspended job in step S12. Next, in step S13, the portal screen display controller 532 allows the display panel 30 to display an initial screen i.e. any one of portal screens having been displayed before the stop/clear key 42 is pressed on. Then, the operation of FIGS. 5 and 6 is terminated.

Referring back to FIG. 5, when it is determined in step S2 that the screen displayed on the display panel 30 is not a portal screen (NO in step S2), the job executing portion 51 determines in step S14 whether or not a scanning is in operation. Here, when it is determined that the scanning is not in operation (NO in step S14), the routine proceeds to the operation in step S17.

Figure 7A:
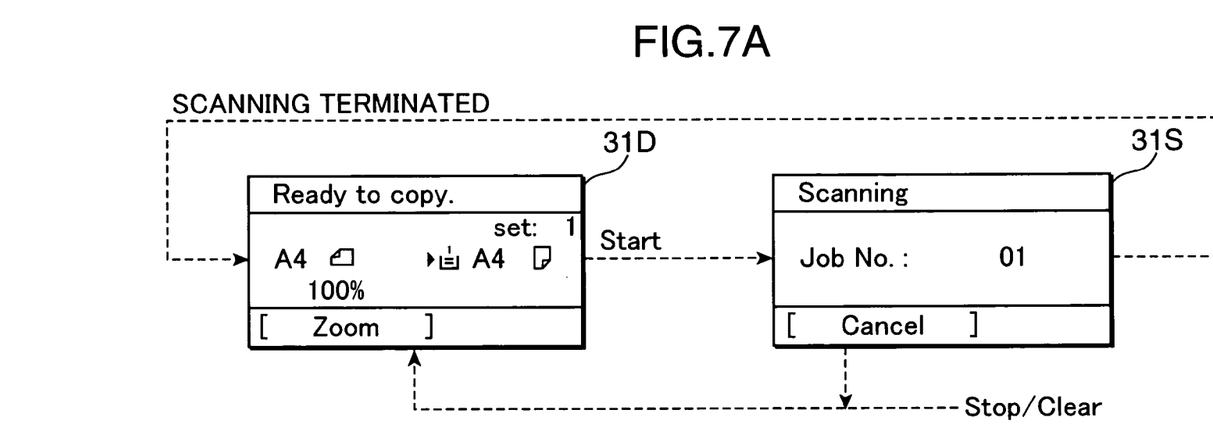
FIG. 7A shows an example of screens which are displayed when a scanning is executed in a copy job.
Figure 7B:
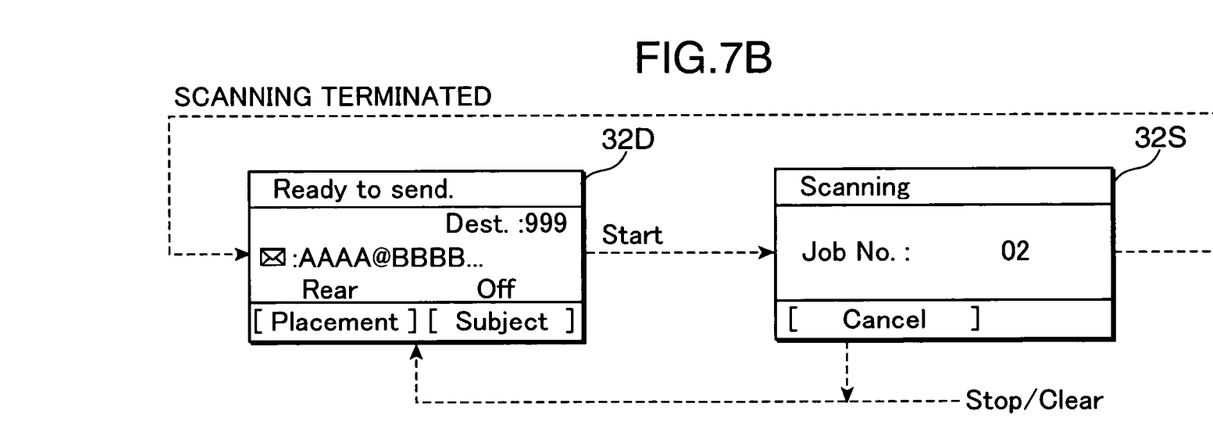
FIG. 7B shows an example of screens which are displayed when a scanning is executed in a send job.

On the other hand, when it is determined that the scanning is in operation (YES in step S14), the job cancelling portion 56 cancels the scanning operation of a copy job or a send job and allows a sheet in the scanning operation to be discharged in step S15. FIG. 7A shows an example of screens displayed when the scanning is executed in a copy job. FIG. 7B is an example of screens displayed when a scanning is executed in a send job.

The scanning is started when the ready-to-copy screen 31D shown in FIG. 7A or the ready-to-send screen 32D shown in FIG. 7B is displayed and the start key 34 is pressed on. During the scanning, a scanning screen 31S or 32S is displayed. When the scanning is in operation, the first function key 35 is operable to serve as a scanning cancelling key. When the key is pressed, an operation which is the same as that of step S7 is performed.

Next, in step S16, the portal screen display controller 532 allows the display panel 30 to display a portal screen i.e. the ready-to-copy screen 31D or the ready-to-send screen 32D having been displayed before the scanning is executed. Then, the operation of FIGS. 5 and 6 is terminated. Thus, when the stop/clear key 42 is pressed on in this state, the operation of FIG. 5 is resumed, and the routine proceeds through the steps S1 to S6. Then, the suspending job list screen 40D is displayed.

When it is determined in step S14 that the scanning is not in execution (NO in step S14), the job executing portion 51 determines in step S17 whether or not the setting screen is displayed. The setting screen includes the above-described magnification rate setting screen and the subject setting screen. Here, when it is determined that the setting screen is not displayed (NO in step S17), the operation in FIGS. 5 and 6 is terminated.

On the other hand, when it is determined that the setting screen is displayed (YES in step S17), the job executing portion 51 clears a set value of a selected representation (a representation on which a cursor is positioned) in step S18. Then, the operation in FIGS. 5 and 6 is terminated.

According to the show embodiment, when the stop/clear key 42 is pressed on, or when the status menu screen 33D is displayed and the first function key 35 which serves as a suspending key is pressed on, a job in execution is suspended in response to the press-on. Then, the suspending job list screen 40D listing the suspending jobs and waiting jobs is displayed on the display panel 30. When the suspending job list screen 40D is displayed and a user operates the first function key 35 to give an instruction of cancelling a selected representation, the job cancelling confirmation screen 44 is displayed on the display panel 30 in response to the press-on. Further, when the suspending job list screen 40D is displayed and a user operates the second function key 36 to give a job resuming instruction, the suspension is released and a previous screen having been displayed before the suspending job list screen 40D is displayed. Then, in response to a press-on of the first function key 35 in the job cancelling confirmation screen 44, the suspending job list screen 40D is displayed.

Thus, in a case of cancelling a plurality of jobs selectively, a user can cancel the jobs by pressing on the stop/clear key 42 once and selecting a job. Accordingly, in a job cancelling operation, a user is prevented from being confused in a key selection, and operability can be improved. Further, only the printing-out operation is suspended in response to the press-on of the stop/clear key 42. Thus, the printing operation to a sheet which is likely to be wasted can be suspended, and the printing can be outputted in a high speed in a case of resuming the printing to a recording sheet after releasing the suspension.

Further, when the ready-to-copy screen 31D, the ready-to-send screen 32D, or the status menu screen 33D is displayed on the display panel 30 and the stop/clear key 42 is pressed on, a printing-out operation of a running job is suspended after the running printing-out operation of a page is completed. Accordingly, an irrelevant response to the wrong press-on of the stop/clear key 42 by a user can be prevented, and a response can be made to the cancelling of a job.

Further, when the first function key 35 which corresponds to a suspending key of suspending a job is pressed before the job cancelling is performed by the press-on of the stop/clear key 42 in the status menu screen 33D, a response can be made to the job cancelling request. Accordingly, operability can be improved.

Further, when the ready-to-copy screen 31D is displayed on the display panel 30 and the stop/clear key 42 is pressed, the copy number is cleared to be "1". Thus, even when one multi-purpose key is made operable to serve as the stop key of suspending a job and a clear key of clearing the copy number, a user can only clear the number of copies, or can clear the number of copy and suspend the job with a small numbers of operation steps.

Furthermore, when the scanning operation of the copy job is in execution and the stop/clear key 42 or the first function key 35 is pressed on, the copy job is cancelled, and a sheet in execution is discharged. Then, the ready-to-copy screen 31D is displayed on the display panel 30. In other words, when it is displayed that the scanning operation is in execution and one of these keys is pressed on before the printing-out operation of the copy job is executed, there is a likelihood that a user would like to cancel the copy job without suspending the copy job. Therefore, the scanning is cancelled without suspending the copy job. Accordingly, user operability can be improved.

Similarly, when the scanning operation of the send job (facsimile transmission job) is in execution and the stop/clear key 42 or the first function key 35 is pressed on, the send job is cancelled, and a sheet in execution is discharged. Then, the ready-to-send screen 32D is displayed on the display panel 30. In other words, when it is displayed that the scanning is in operation and one of these keys is pressed on before the sending-out operation of the send job is executed, there is a likelihood that a user would like to cancel the send job without suspending the send job. Accordingly, user operability can be further improved.

In the present embodiment, the cancel job selection receiving portion 54 receives a user selection of one job to be cancelled among the job displayed on the suspending job list screen 40D. However, the present invention is not especially limited to this, and may receive a user selection of a plurality of jobs. In such case, the job cancelling portion 56 cancels all of the plurality of jobs received by the cancel job selection receiving portion 54.

The specific embodiment, described above mainly includes an invention mainly including the following configurations.

An image forming apparatus according to one aspect of the present invention comprises: a job executing portion for executing at least one of a copy job, a print job, a facsimile reception job, an e-mail reception job, a facsimile transmission job, and an e-mail transmission job; a display portion; an operation portion including a stop key for receiving an instruction to suspend a running job which is in execution; a suspending portion for suspending a printing-out operation of the running job in response to a press-on of the stop key; a job list screen display controller for allowing the display portion to display a job list screen showing the job suspended by the suspending portion and a waiting job; a cancel job selection receiving portion for receiving a user selection of a job to be cancelled among the jobs displayed on the job list screen; and a job cancelling portion for cancelling the job received by the cancel job selection receiving portion.

According to this configuration, at least one of a copy job, a print job, a facsimile reception job, an e-mail reception job, a facsimile transmission job, and an e-mail transmission job is executed, and a printing-out operation of the running job which is in execution is suspended in response to a press-on of the stop key for receiving an instruction to suspend a running job which is in execution. Then, a job list screen showing the suspended job and a waiting job is displayed on the display portion. Successively, a user selection of a job to be cancelled among the jobs displayed on the job list screen is received, and only the received job is cancelled.

Thus, in a case of cancelling a plurality of jobs selectively, a user can cancel a job by pressing on the stop key once and selecting a job. Accordingly, a user can be prevented from being confused in selection of a key in a job cancelling operation, and operability can be improved. Further, only the printing-out operation is suspended in response to the press-on of the stop key. Accordingly, the printing to a sheet which is likely to be wasted can be suspended, and the printing can be outputted in a high speed in a case of resuming the printing to a sheet after the suspending is released.

Further, in the above-described image forming apparatus, it is preferable that the suspending portion suspends a printing-out operation in response to the press-on of the stop key after the running printing-out operation of a page is completed.

According to this configuration, a printing-out operation is suspended in response to the press-on of the stop key after the running printing-out operation of a page is completed. Accordingly, it prevents suspension of operation while a recording sheet which is in operation of printing-out and left in an apparatus, and a job after being released from suspending or a job after a cancelling can be resumed rapidly.

Further, in the above-described image forming apparatus, it is preferable that the suspending portion suspends the printing-out operation of at least one of the copy job, the print job, the facsimile reception job, and the e-mail reception job when the stop key is pressed on in execution of at least one of the copy job, the facsimile transmission job, and the e-mail transmission job.

According to this configuration, when the stop key is pressed on in execution of at least one of the copy job, the facsimile transmission job, and the e-mail transmission job, the printing-out operation of at least one of the copy job, the print job, the facsimile reception job and the e-mail reception job is suspended.

Thus, when the stop key is pressed on in execution of at least one of the copy job, the facsimile transmission job, and the e-mail transmission job, the printing-out operation of at least one of the copy job, the print job, the facsimile reception job, and the e-mail reception job in execution can be suspended.

Further, it is preferable that the above-described image forming apparatus further comprises a confirmation screen display controller for allowing the display portion to display a job cancelling confirmation screen for user confirmation about whether or not the job received by the cancel job selection receiving portion should be cancelled. When it is confirmed in the job cancelling confirmation screen that the job received by the cancel job selection receiving portion should be cancelled, the job cancelling portion cancels the job.

According to this configuration, a job cancelling confirmation screen for user confirmation about whether or not the received job should be canceled is displayed on the display portion. When it is confirmed with the job cancelling confirmation screen that that the received job should be cancelled, the job is cancelled.

Thus, even when a user presses on the stop key by mistake, a user can confirm whether or not the received job is surely cancelled through the job cancelling confirmation screen.

Further, in the above-described image forming apparatus, it is preferable that the job list screen display controller allows the display portion to display a job list screen not showing the job cancelled by the job cancelling portion.

According to this configuration, a job list screen not showing the cancelled job is displayed on the display portion. Accordingly, a user can select cancel jobs successively. Especially, a user can select cancel job easily when he cancels a plurality of jobs.

Further, it is preferable that the above-described image forming apparatus further comprises a resume instruction receiving portion for receiving a resume instruction of resuming the job suspended by the suspending portion. When the resume instruction receiving portion receives the resume instruction, the job executing portion resumes the job suspended by the suspending portion. According to this configuration, the suspended job is resumed. Accordingly, even when a user presses on the stop key by mistake, the suspending of a job can be released.

Further, in the above-described image forming apparatus, it is preferable that the operation portion includes a first function key and a second function key which are arranged adjacent to the display portion. The job list screen has a first representation at a position adjacent to the first function key to indicate that the first function key is a key for giving an instruction to cancel a job, and a second representation at a position adjacent to the second function key to indicate that the second function key is a key for giving an instruction to resume a suspended job. The job cancelling portion cancels the job received by the cancel job selection receiving portion in response to a press-on of the first function key. The job executing portion resumes the job suspended by the suspending portion in response to a press-on of the second function key.

According to this configuration, the operation portion further includes the first function key and the second function key which are arranged adjacent to the display portion. The job list screen has a first representation at a position adjacent to the first function key to indicate that the first function key is a key for giving an instruction to cancel a job, and a second representation at a position adjacent to the second function key to indicate that the second function key is a key for giving an instruction to resume a suspended job. A received job is cancelled in response to press-on of the first function key, and a suspended job is resumed in response to a press-on of the second function key.

Thus, whether or not a selection of a job by a user should be cancelled can be easily determined by a press-on of two keys arranged adjacent to the display portion. Accordingly, user operability can be improved.

Further, it is preferable that the above-described image forming apparatus further comprises a portal screen display controller for allowing the display portion to display a ready-to-copy screen for receiving an instruction to start copying, a ready-to-send screen for receiving an instruction to start transmission of at least one of a facsimile and an e-mail, and a status menu screen for displaying a job state, a job log and a hardware resource state in accordance with a selective operation of the operation portion, and the suspending portion determines in response to the press-on of the stop key whether or not the ready-to-copy screen, the ready-to-send screen, or the status menu screen is displayed on the display portion, and suspends the printing-out operation of a running job when determining that the ready-to-copy screen, the ready-to-send screen or the status menu screen is displayed on the display portion.

According to this configuration, a ready-to-copy screen for receiving an instruction to start copying, a ready-to-send screen for receiving an instruction to start transmission of at least one of a facsimile and an e-mail, and a status menu screen for displaying a job state, a job log and a hardware resource state are selectively displayed on the display portion in accordance with an operation of the operation key. Then, in response to the press-on of the stop key, it is determined whether or not the ready-to-copy screen, the ready-to-send screen, or the status menu screen is displayed on the display portion. When it is determined that the ready-to-copy screen, the ready-to-send screen, or the status menu screen is displayed on the display portion, the printing-out operation of a running job which is in execution is suspended.

Thus, if the ready-to-copy screen, the ready-to-send screen or the status menu screen is not displayed on the display portion, the job is not suspended even when the stop key is pressed on. Accordingly, an irrelevant response due to a wrong press-on of the stop key by a user is prevented, and a response to a job cancel request can be made.

Further, in the above-described image forming apparatus, it is preferable that the operation portion include a function key arranged adjacent to the display portion. The status menu screen has a representation at a position adjacent to the function key to indicate that the function key is a key for giving an instruction of suspension, and the suspending portion determines in response to a press-on of the stop key whether or not the status menu screen is displayed on the display portion, and suspends the printing-out operation of a running job when determining that the status menu screen is displayed on the display portion.

According to this configuration, a function key is arranged adjacent to the display portion, and the status menu screen has a representation at a position adjacent to the function key to indicate that the function key is a key for giving an instruction of suspension. Then, in response to a press-on of the function key, it is determined whether or not the status menu screen is display portion. When it is determined that the status menu screen is displayed on the display portion, the printing-out operation of a running job is suspended.

Thus, a response to a job cancel request can be made not only by a press-on of the stop key but also by a press-on of the function key arranged adjacent to the display portion, and operability can be further improved.

Further, in the above-described image forming apparatus, it is preferable that the stop key is operable to serve as a set value clear key for clearing a set value, and the suspending portion clears the set copy number when the stop key is press-on and the ready-to-copy screen is displayed on the display portion, and determines whether or not the display portion displays the ready-to-copy screen, the ready-to-send screen, or the status menu screen.

According to this configuration, the stop key is operable to serve as a set value clear key for clearing a set value, the suspending portion clears the set copy number when the stop key is press-on and the ready-to-copy screen is displayed on the display portion. Thereafter, it is determined whether or not the ready-to-copy screen, the ready-to-send screen or the status menu screen is displayed on the display portion.

Thus, even when one multi-purpose key is made operable to serves as the stop key for suspending a job and the set value clear key for clearing the set value, a user can perform without confusion the clearing of the number of copies, or both the clearing of the number of copies and suspension of a job with a small number of operation steps.

Further, in the above-described image forming apparatus, it is preferable that the operation portion includes a start key for receiving an instruction to execute the copy job. The job executing portion activates a scanning operation of the copy job when the ready-to-copy screen is displayed on the display portion and the start key is pressed on. The job cancelling portion cancels the copy job, and allows a sheet in execution to be discharged, and allows the display portion to display the ready-to-copy screen when the scanning operation is in execution and the stop key is pressed on.

According to this configuration, when the start key for receiving an instruction to execute the copy job is pressed on, and the ready-to-copy screen is displayed on the display portion, the scanning operation of the copy job. When the scanning operation is in execution and the stop key is pressed on, the copy job is cancelled, and a sheet in execution is discharged. Then, the ready-to-copy screen is displayed on the display portion.

Thus, when the scanning operation is in execution, and the stop key is pressed on, it is likely that a user desires to cancel the copy job, and the copy job is cancelled without suspension. Accordingly, operability of a user can be improved.

Further, in the above-described image forming apparatus, it is preferable that the operation portion includes a start key for receiving an instruction to execute the facsimile transmission job. The job executing portion activates a scanning operation of the facsimile transmission job when the ready-to-send screen is displayed on the display portion and the start key is pressed on. The job cancelling portion cancels the facsimile transmission job, and allows a sheet in execution to be discharged, and allows the display portion to display the ready-to-send screen when the scanning processing is in execution and the stop key is pressed on.

According to this configuration, when the ready-to-send screen is displayed on the display portion, and the start key for receiving an instruction to execute the facsimile transmission job is pressed on, the scanning operation of the facsimile transmission job is activated. Then, when the scanning operation is in execution, and the stop key is pressed on, the facsimile transmission job is cancelled, and a sheet in execution is discharged is discharged, and the ready-to-send screen is displayed on the display portion.

Thus, when the scanning operation is in execution, and the stop key is pressed on, it is likely that a user desires to cancel the facsimile transmission job. Accordingly, the facsimile transmission job is cancelled without suspension, and a user's operability can be improved.

This application is based on Japanese Patent application serial no. 2006-192573 filed in Japan Patent Office on Jul. 13, 2006, the contents of which are hereby incorporated by reference.

Although the present invention has been fully described by way of example with reference to the accompanying drawings, it is to be understood that various changes and modifications will be apparent to those skilled in the art. Therefore, unless otherwise such changes and modifications depart from the scope of the present invention hereinafter defined, they should be construed as being included therein.

What is claimed is:

1. An image forming apparatus comprising:
a job executing portion for executing at least one of a copy job, a print job, a facsimile reception job, an e-mail reception job, a facsimile transmission job, and an e-mail transmission job;
a display portion;
an operation portion including a stop key for receiving an instruction to suspend a running job which is in execution;
a suspending portion for suspending a printing-out operation of the running job in response to a press-on of the stop key;
a job list screen display controller for allowing the display portion to display a job list screen showing the job suspended by the suspending portion and a waiting job;
a cancel job selection receiving portion for receiving a user selection of a job to be cancelled among the jobs displayed on the job list screen;
a job cancelling portion for cancelling the job received by the cancel job selection receiving portion; and
a portal screen display controller for allowing the display portion to display a ready-to-copy screen for receiving an instruction to start copying, a ready-to-send screen for receiving an instruction to start transmission of at least one of a facsimile and an e-mail, and a status menu screen for displaying a job state, a job log and a hardware resource state in accordance with a selective operation of the operation portion, wherein the suspending portion determines in response to the press-on of the stop key whether or not the ready-to-copy screen, the ready-to-send screen, or the status menu screen is displayed on the display portion, and suspends the printing-out operation of a running job when determining that the ready-to-copy screen, the ready-to-send screen or the status menu screen is displayed on the display portion.

2. The image forming apparatus according to claim 1, wherein the suspending portion suspends a printing-out operation in response to the press-on of the stop key after the running printing-out operation of a page is completed.

3. The image forming apparatus according to claim 1, wherein
the suspending portion suspends the printing-out operation of the at least one of the copy job, the print job, the facsimile reception job, and the e-mail reception job when the stop key is pressed on in execution of at least one of the copy job, the facsimile transmission job, and the e-mail transmission job.

4. The image forming apparatus according to claim 1, further comprising:
a confirmation screen display controller for allowing the display portion to display a job cancelling confirmation screen for user confirmation about whether or not the job received by the cancel job selection receiving portion should be cancelled, wherein
when it is confirmed in the job cancelling confirmation screen that the job received by the cancel job selection receiving portion should be cancelled, the job cancelling portion cancels the job.

5. The image forming apparatus according to claim 1, wherein the job list screen display controller allows the display portion to display a job list screen not showing the job cancelled by the job cancelling portion.

6. The image forming apparatus according to claim 1, further comprising:
a resume instruction receiving portion for receiving a resume instruction of resuming the job suspended by the suspending portion, wherein
when the resume instruction receiving portion receives the resume instruction, the job executing portion resumes the job suspended by the suspending portion.

7. The image forming apparatus according to claim 1, wherein:
the operation portion includes a first function key and a second function key which are arranged adjacent to the display portion,
the job list screen has a first representation at a position adjacent to the first function key to indicate that the first function key is a key for giving an instruction to cancel a job, and a second representation at a position adjacent to the second function key to indicate that the second function key is a key for giving an instruction to resume a suspended job,
the job cancelling portion cancels the job received by the cancel job selection receiving portion in response to a press-on of the first function key; and
the job executing portion resumes the job suspended by the suspending portion in response to a press-on of the second function key.

8. The image forming apparatus according to claim 1, wherein:
the operation portion includes a function key arranged adjacent to the display portion,
the status menu screen has a representation at a position adjacent to the function key to indicate that the function key is a key for giving an instruction of suspension, and
the suspending portion determines in response to a press-on of the stop key whether or not the status menu screen is displayed on the display portion, and suspends the printing-out operation of a running job when determining that the status menu screen is displayed on the display portion.

9. The image forming apparatus according to claim 1, wherein:
the stop key is operable to serve as a set value clear key for clearing a set value,
the suspending portion clears the set copy number when the stop key is press-on and the ready-to-copy screen is displayed on the display portion, and determines whether or not the display portion displays the ready-to-copy screen, the ready-to-send screen, or the status menu screen.

10. The image forming apparatus according to claim 1, wherein:
the operation portion includes a start key for receiving an instruction to execute the copy job;
the job executing portion activates a scanning operation of the copy job when the ready-to-copy screen is displayed on the display portion and the start key is pressed on; and
the job cancelling portion cancels the copy job, and allows a sheet in execution to be discharged, and allows the display portion to display the ready-to-copy screen when the scanning operation is in execution and the stop key is pressed on.

11. The image forming apparatus according to claim 1, wherein:
the operation portion includes a start key for receiving an instruction to execute the facsimile transmission job;
the job executing portion activates a scanning operation of the facsimile transmission job when the ready-to-send screen is displayed on the display portion and the start key is pressed on; and
the job cancelling portion cancels the facsimile transmission job, and allows a sheet in execution to be discharged, and allows the display portion to display the ready-to-send screen when the scanning operation is in execution and the stop key is pressed on.

* * * * *